Figure 1:
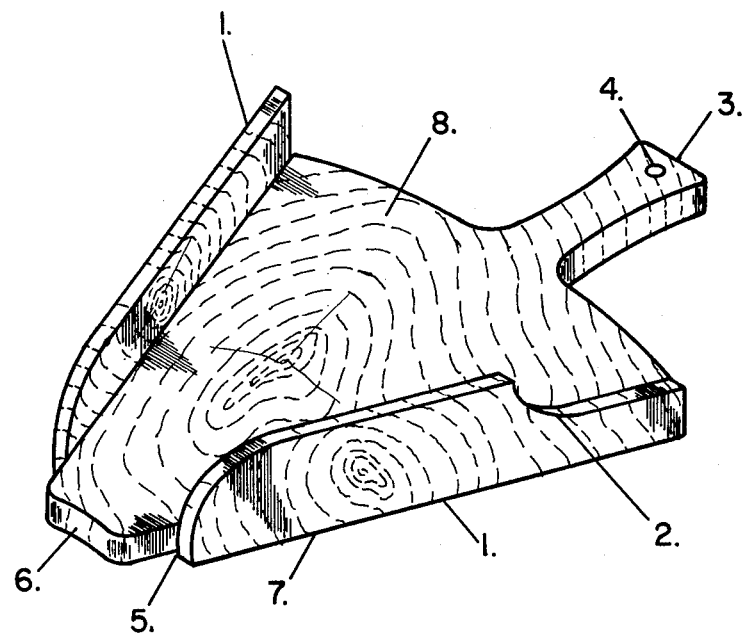

United States Patent [19]

Price

[11] 4,447,051
[45] May 8, 1984

[54] KITCHEN CHOPPING BOARD

[76] Inventor: Edwin A. Price, 16001 E. 11th Ave., Aurora, Colo. 80011

[21] Appl. No.: 290,309

[22] Filed: Aug. 5, 1981

[51] Int. Cl.³ .............................................. A47J 43/00
[52] U.S. Cl. .................................. 269/302.1; 141/98;
 D7/46; 269/289 R
[58] Field of Search ................ 269/302.1, 289 R, 290,
 269/293, 295, 13, 303, 315; 141/98, 331; D7/46

[56] References Cited

U.S. PATENT DOCUMENTS

| D. 239,688 | 4/1976 | Doman .................................. D7/46 |
| D. 248,078 | 6/1978 | Warnekros ........................ 141/98 X |
| D. 262,507 | 1/1982 | Wooldridge ............................ D7/46 |
| D. 265,537 | 7/1982 | Stockdale .............................. D7/46 |
| 458,175 | 8/1891 | Larkins ............................. 141/98 X |
| 1,039,574 | 9/1912 | Morrill ........................................ 141/98 |
| 1,076,882 | 10/1913 | Golden ................................... 269/295 |
| 1,251,026 | 12/1917 | Hitchcock ......................... 269/302.1 |
| 1,257,099 | 2/1918 | Nace et al. ....................... 269/303 X |
| 2,104,278 | 1/1938 | Schultz ............................. 269/303 X |
| 2,812,784 | 11/1957 | Palmer ....................................... 141/98 |
| 4,100,676 | 7/1978 | Ferguson ......................... 269/302.1 |
| 4,273,318 | 6/1981 | Crowhurst ..................... 269/302.1 X |
| 4,341,376 | 7/1982 | Germinario ..................... 269/295 X |
| 4,356,749 | 11/1982 | Spencer .......................... 269/303 X |

FOREIGN PATENT DOCUMENTS

| 2408436 | 7/1979 | France ................................... 269/307 |
| 693432 | 7/1953 | United Kingdom ................ 269/290 |
| 1299596 | 12/1972 | United Kingdom ............. 269/302.1 |

*Primary Examiner*—Frederick R. Schmidt
*Assistant Examiner*—Steven P. Schad

[57] ABSTRACT

A chopping-cutting board wherein an improvement in configuration allows chopped foods to be contained during and after processing by means of two lateral side barriers, one of which incorporates a cutaway opening on the rear, to provide a passage for long food objects to be delivered for cutting while providing a full length opposite vertical side barrier, for more fully containing foods being processed on the cutting surface. These tapering side barriers also provide, on the front tips, a wedging action for opening and holding in place plastic freeze bags to facilitate dispensing board contents therein.

The general triangular shape of the board relates to the arc described by a french chopping knife. As the tip of a knife is held as a pivot, the handle end of the board describes this arc as it follows the movement described by the knife creating the shape relating to the board. A funneling action is evidenced by the configuration of the board, utilizing the side barriers to guide the food particles as the provided handle is elevated by the operator.

A stationary container and board rest is provided under the front tip of the board. This allows the board to stabilize as the handle end is elevated by an operator, thus preventing the board from slipping into the container as foods are poured out.

On the combination side barrier attachment option, there is provided a swinging and oscillating gate which contains the slicing guide as depicted in the drawings. The slicing guide is capable of providing thin or thick slices of foods as desired by the operator.

3 Claims, 9 Drawing Figures

U.S. Patent    May 8, 1984    Sheet 1 of 4    4,447,051

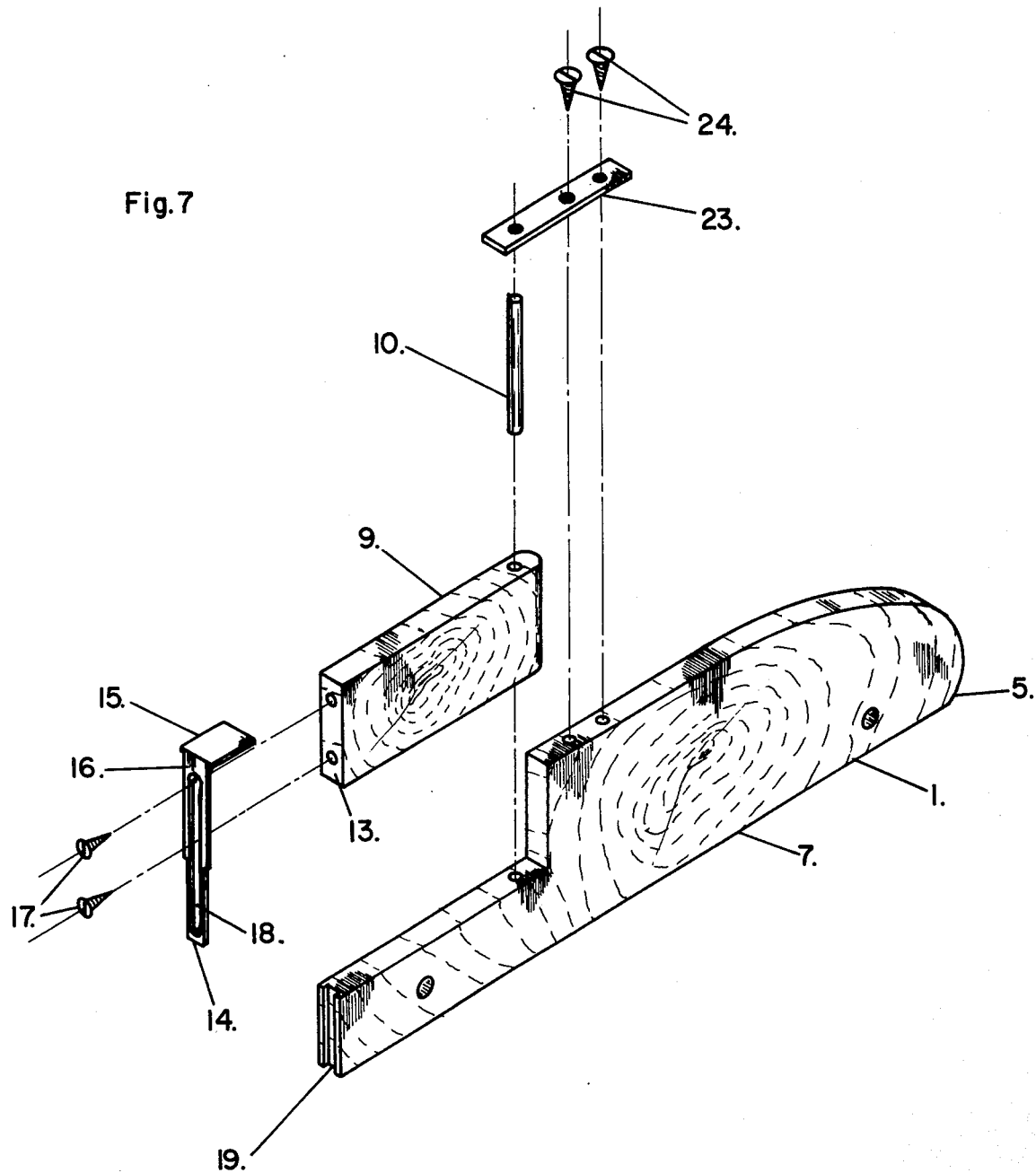

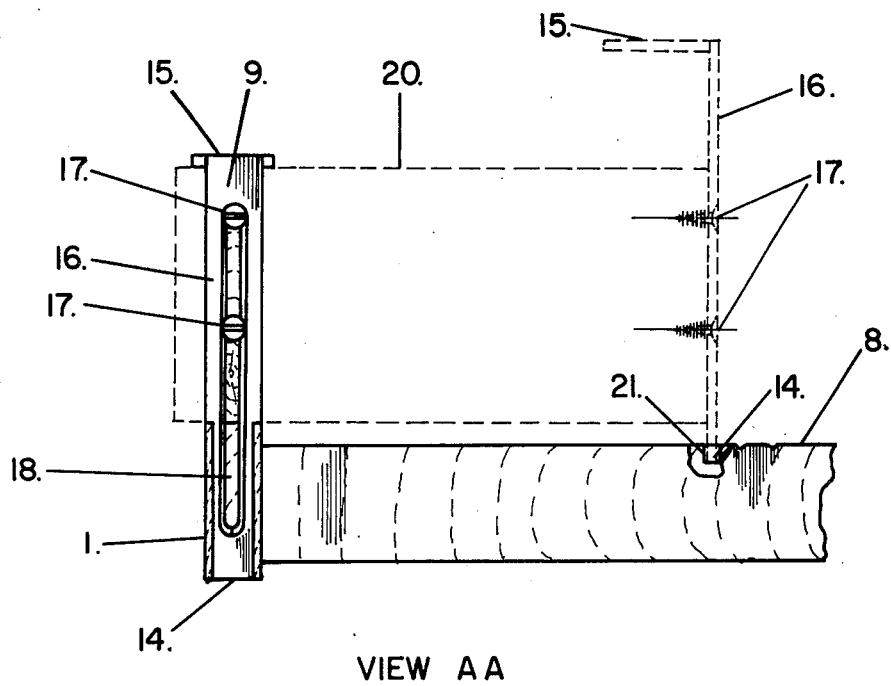
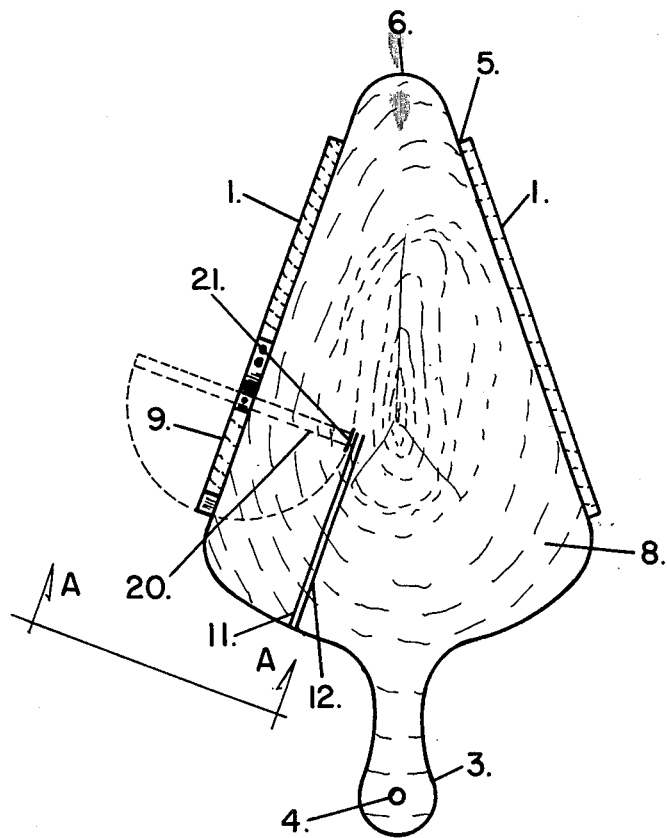

KITCHEN CHOPPING BOARD

SUMMARY

The present invention relates, generally, to improvements in and in conjunction with food chopping boards and similar fixtures. For clarity of description, a board of any suitable material will be referred to as "board". The present embodiment provides a continuous side barrier, tapering from the tail to the nose of the cutting surface, so as to channel the sliced or chopped items toward the desired container when the board is inclined by an operator.

Herein the funneling and pouring action results, i.e., a more efficient operation than open or partially open cutting boards. This simplicity in transferring contents represents a marked and novel improvement over present boards. The present invention in the preferred configuration is provided with two side barriers, fences or food retainers which prevent a substantial amount of foods from flying off the cutting surface as the food is being cut up. The side barriers also provide a right angle inside configuration which connects with the cutting surface, that allows the food to be trapped and finely chopped or minced. Whereas, when mincing on an open surface cutting board, the food tends to move to either or both sides of the knife or leaves the board entirely, often times becoming a time consuming and futile operation. An object of this invention is to provide a compact cutting surface which allow effective chopping, mincing and slicing of foods, eliminating the more massive cutting areas of present boards.

Another feature of this invention provides a side feed in opening, in the form of a notch or cut out in one side barrier. The opening allows a passage for long food objects to enter the board for subsequent slicing or chopping. Among other objects, this invention includes a slicing guide, that provides a swiveling gate or door, connected to and in conjunction with the side feed in opening, providing a vertical slicing knife rest or guide, which provides the operator a uniform and even cut. Utilizing the inlaid slicing guide lines incorporated into this gate system, (said inlays being of a darker color than the cutting surface), the operator can then uniformly slice thick or thin slices of desired foods by feeding towards the appropriate guide line and then slicing the food.

The appended hinged or pivoting door or gate, therefore, not only oscillates within a 180° arc to provide the operations, but also with a slide bolt incorporated into the side opposite the hinged end, locks into position forming a straight, lengthened side barrier—thereby more completely containing foods being prepared.

Encompassed into this invention is a bowl rest near the nose tip of the board, which stabilizes the board as foods are poured into a container. Also, a handle is provided on the board, the handle being of a flared construction, and attached to the wide rear end portion of the main body, is equally thick as main body, and provides no obstruction to a moving cutting knife. This appendage utilizes a drilled hole with which to hang the board on a wall or other suitable surface when not in use.

Finally, the generally tapering configuration of the board, with its side barriers, provide for an interference fit of plastic freezer bags or similar containers, simultaneously holding the bag open and in position to receive the items to be transferred most efficiently.

BRIEF DRAWING DESCRIPTION

Figure 2:
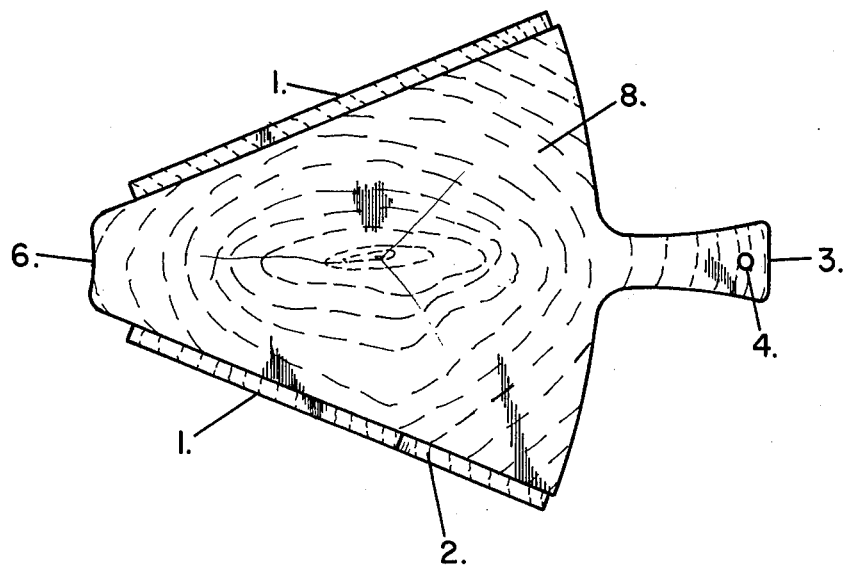
Figure 3:
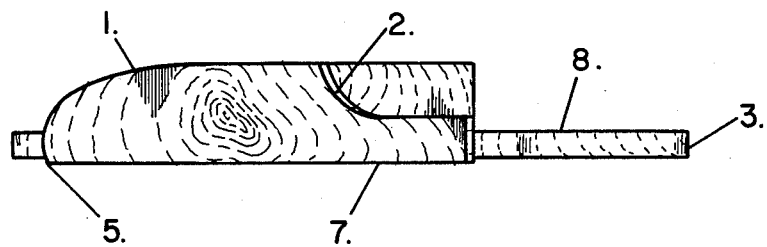
Figure 4:
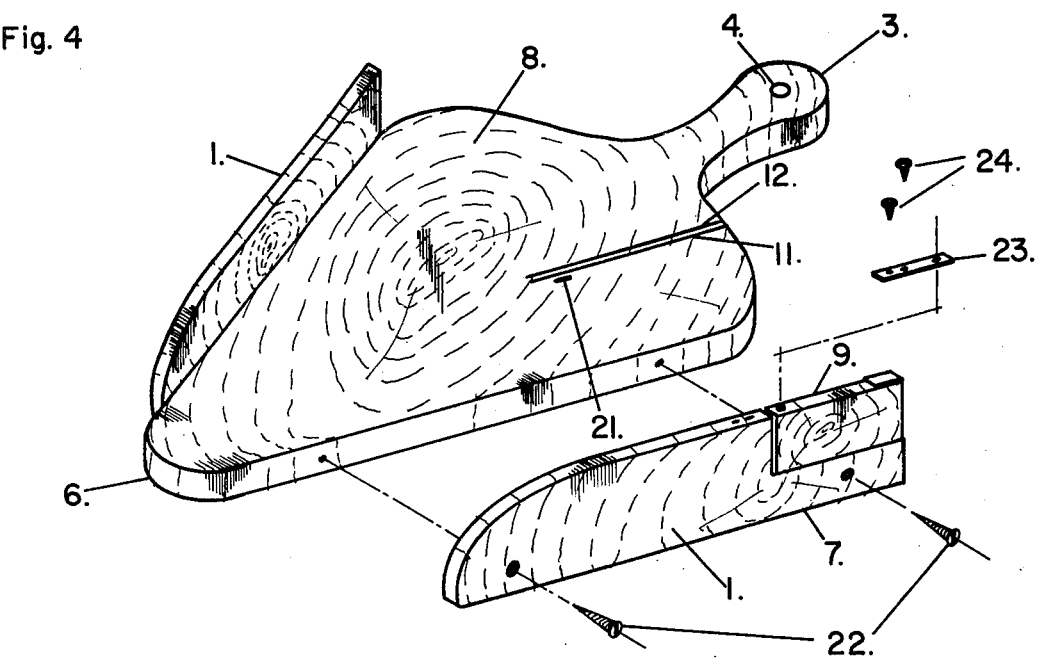
Figure 5:
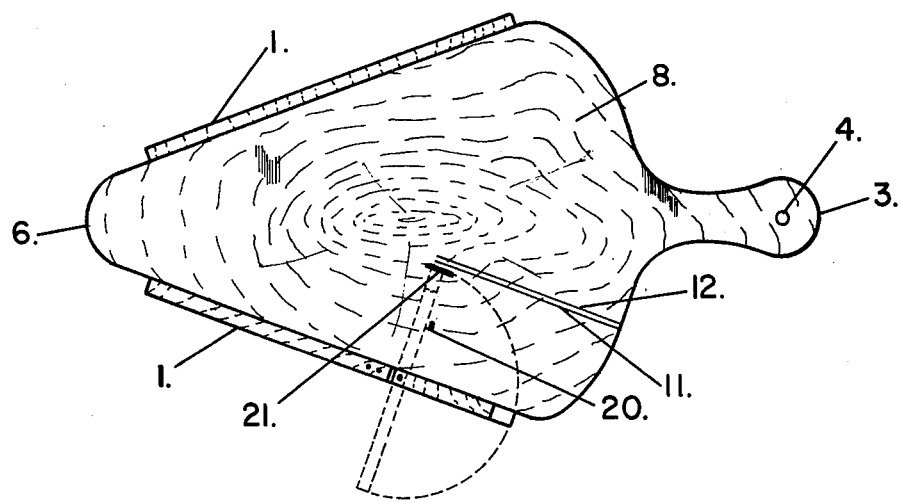
Figure 6:
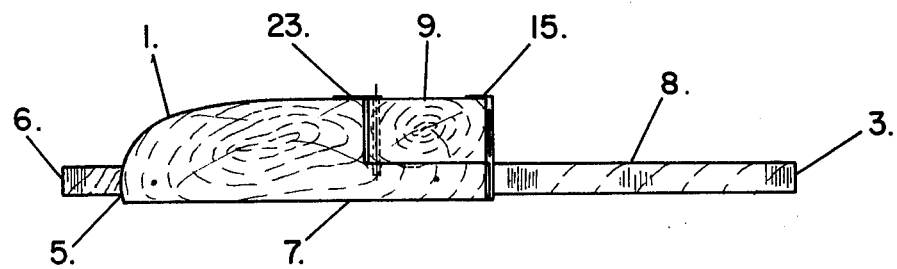

FIG. 1. Isometric view of present invention
FIG. 2. Top view of present invention
FIG. 3. Side view of present invention
FIG. 4. Exploded isometric view, showing alternate configuration, incorporating side gate attachment
FIG. 5. Top view showing relative movement of gate attachment
FIG. 6. Side view showing side gate attachment
FIG. 7. Exploded isometric view of gate attachment and slider knife guide
FIG. 8. Fragmentary elevation showing relative movement of gate/slicer knife guide attachment along lines AA
FIG. 9. Top view along lines AA

DETAILED DRAWING DESCRIPTION

Referring to the drawings, illustrations one through nine:

Figure one illustrates the two side barriers, guides, or walls (1), running the full length of the sides of the chopping board. Said barriers being attached to main body (8) by fasteners (22). Incorporated into side barriers (1) is a side feed in opening (2) for feeding in of long food items through either or both sides of the cutting board, as is preferred by an operator to perform cutting operation. Handle of board (3) through which a passage or hole (4) is provided for hanging the board on vertical or other suitable surfaces using hooks or pegs when not in use.

The food, when chopped, minced or sliced on the board surface (8), is contained by side barriers (1), which prevent a significant amount of the contents from leaving the cutting surface (8) onto the table, floor or other foreign areas. The junction of the cutting surface (8), together with the side barriers (1), provide a preferable 90° angle. Cutting of foods contained within said junction provides the operator a most effective mincing action. Also shown is the container rest lip (5), which is the combination of the lower front tip of the side barriers (1) and the tip or nose of board (6). This area tends to provide a rest position and pivoting location for the board when the contents are moved into a container.

As the contents are poured into a container, utilizing the funnel type design of the board (8) and side barrier (1), the handle (3) of the board (8) describes an upward arc as the handle (3) is elevated by the operator, relative to stationary resting pivotal point (5), the container rest lip. This action results in allowing all food contents contained on the board to be deposited efficiently into desired container.

The lower supporting rail (7) is a feature which may be incorporated into the side barriers (1) lower edges. This rail protrudes beyond bottom or lower surface of the board (8). The rail allows the board (8) to be elevated above a working surface or table, providing a space between board (8) and working area or table, allowing further sanitary working conditions. Specifically, the combination of the lower supporting rail (7) and board nose (6) provide the container rest pivotal point (5).

The combination gate (9) and slider guide (15) attachment joins to the side barrier (1) with a hinge pin (10), which allows for radial movement of gate and guide (9)(15) within an 180° arc. The inlaid slicing guidelines (11)(12) allow an operator to perform uniform, measured slicing of thin (11) or thick (12) slices of foods, as desired. The sliding guide (15) is a combination gate (9) position lock and knife rest and guide.

Using the gate edge (13) opposite the hinge pin (10) slider unit (15), utilizes embedded slot guide pins (17), which pass within slider guide slot (18) to keep gate (9) aligned with side barrier (1) lower portion. Slider (15), when not in slicing mode (20), normally holds gate (9) in place, aligned with side barrier (1) by slider bottom tip (14) interlocking with lower keeper slot (19), thereby providing an elongated side barrier.

Consequently, when utilized in the slicing mode (20), slider (15) is raised by lifting up on the slider ear or bend, which is the upper portion of slider (15). Then, by radially swinging gate (9) and slider (15) toward inlaid slicing guidelines (11)(12) and then by depressing slider's lower tip (14) into locking cutout or keeper slot (21), the gate (9) and slider attachment (15) is then locked into the slicing mode (20). The said keeper slot (21) is incorporated into face of the board (8) and is aligned relative to the slicing guidelines (11)(12).

The slider (15), now being in the slicing mode (20), is locked into the keeper slot (21), is now elevated proportionally relative to its previous location. This function is due to the depth difference between slot (21) and slot (19), permitting the slider face (16) to act as a knife guide and stabilizer plate when in slicing mode (20), also providing the operator with a taller fixture with which to guide the slicing knife. The brace (23), which spans the distance between the hinge pin (10) and side barrier (1), retains the hinge pin (10) upper portion, using the fasteners (24) embedded in the side barrier (1).

I claim:

1. A foods cutting-chopping board comprising:
   a. a flat, substantially triangularly shaped, one piece main body, provided with a handle affixed to, and as part of, the wide rear end portion of said flat, triangular main body member; and wherein
   b. the laterally opposed side edges of said body are provided with flanges mounted thereupon, and said flanges vertically project therefrom, above said main body's upwardly useable surface, so as to constitute vertically projecting retaining side barriers; and said flanges are affixed to, and extend in one continuous piece, along substantially the entire length of laterally opposed side edges of said main body, in an unbroken linear tangent and wherein
   c. a portion of one of said vertical flanges is cutaway along approximately one-third of its length, said cutaway being nearest handle end of main body, and with the upper edge of the cutaway portion being coplanar with the main body's upwardly useable surface; and
   d. the said cutaway portion has a hinged gate mounted upon the flange's vertical edge, said gate being operable within an arc of 180 degrees, serving as a knife guide plate along the free edge of said gate.

2. A foods cutting-chopping board comprising:
   a. a flat substantially triangularly shaped, one piece main body, provided with a handle affixed to, and as part of, the wide rear end portion of said flat, triangular main body member; and wherein
   b. the laterally opposed side edges of said body are provided with flanges mounted thereupon, and said flanges vertically project therefrom, above said main body's upwardly useable surface, so as to constitute vertically projecting retaining side barriers; and said flanges are affixed to, and extend in one continuous piece, along substantially the entire length of laterally opposed side edges of said main body, in an unbroken linear tangent; and wherein
   c. a portion of one of said vertical flanges is cutaway along approximately one-third of its length, said cutaway being nearest handle end of main body, and with the upper edge of the cutaway portion being coplanar with the main body's upwardly useable surface; and wherein
   d. the said cutaway portion has a hinged gate mounted upon the flange's vertical edge, said gate being operable within an arc of 180 degrees, serving as a knife guide plate along the free edge of said gate; and has a means for securing said gate in selective positions of rotation.

3. A foods cutting-chopping board, according to any one of the preceding claims, wherein the main body is of a flat, one piece, substantially teardrop shape, provided with a handle affixed to, and as part of, the wide rear end portion of said flat, teardrop shaped main body member.

* * * * *